(No Model.)
H. HOLLERITH.
INTEGRATING APPARATUS.
No. 408,106. Patented July 30, 1889.
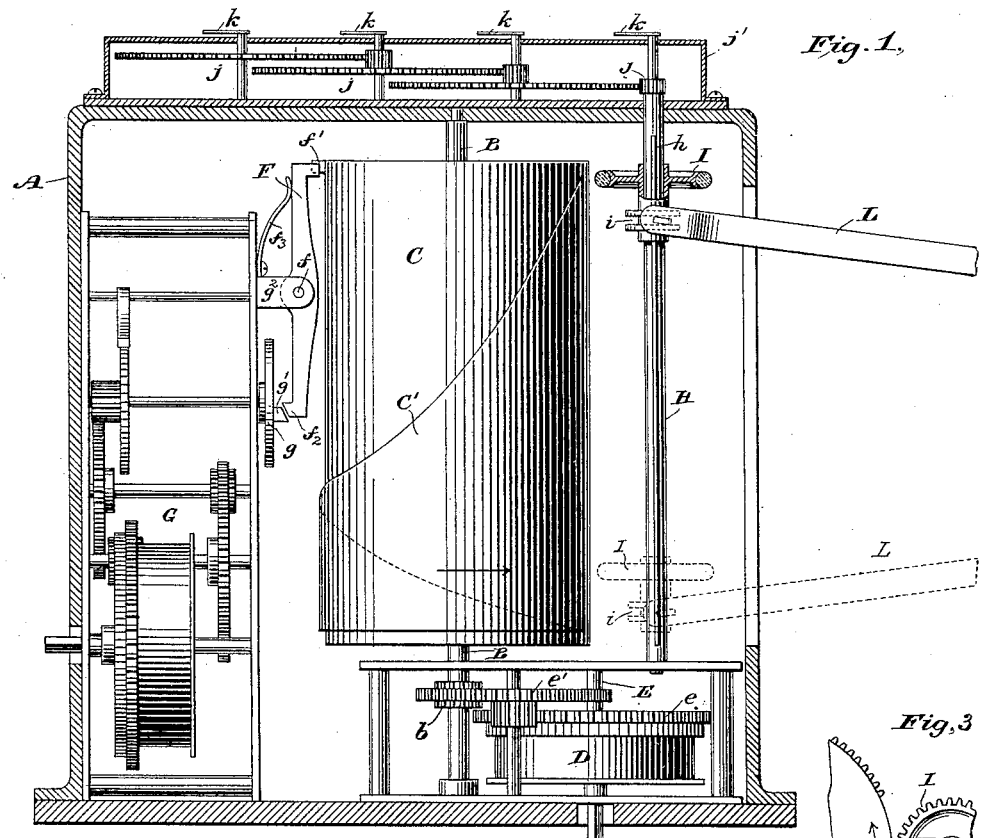
Fig. 1.
Fig. 3.
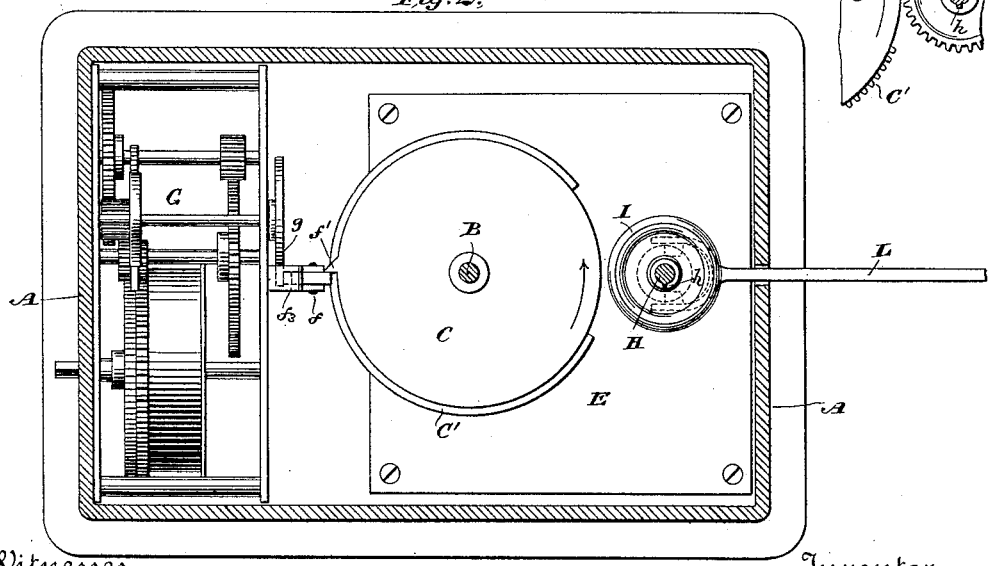
Fig. 2.
Witnesses
Geo. W. Breck.
Henry W. Lloyd.
Inventor,
Herman Hollerith,
By his Attorney,
Samuel G. Metcalf.

UNITED STATES PATENT OFFICE.

HERMAN HOLLERITH, OF NEW YORK, N. Y.

INTEGRATING APPARATUS.

SPECIFICATION forming part of Letters Patent No. 408,106, dated July 30, 1889.

Application filed May 3, 1889. Serial No. 309,432. (No model.)

*To all whom it may concern:*

Be it known that I, HERMAN HOLLERITH, of the city of New York, and State of New York, have invented a certain new and useful Improvement in Integrating Apparatus, of which the following is a full, clear, and exact description, reference being had to the accompanying drawings, forming part of this specification.

My invention relates to an apparatus for automatically integrating and registering the performance of various descriptions of measuring and indicating devices, and is applicable to any device or indicator wherein a variation in the rate, quantity, or strength of the flow of a current through the device is denoted by or causes a definite, although not necessarily a proportional, variation in the movement of the device or some part thereof—such, for instance, as an index-arm.

Under this general description of the apparatus to which my invention may be applied, and which may be designated generically by the term "rate-indicators," may be classed devices for indicating the rate of flow of steam, gas, water, electricity, and other fluids. For instance, it is well known that in numerous electrical devices the rate at which the current is flowing through the apparatus is indicated by the position of an index-arm or pointer. Such an apparatus may therefore be called an "electric rate-indicator." Indicators for determining the rate of flow of a current or volume of steam have long been in use. One special type thereof is constructed with proper inlet and outlet valves and with an internal piston-valve which controls the area of an orifice through which the steam passes. When no steam is passing through the indicator, the orifice is entirely closed; but when steam is admitted by opening the inlet and outlet valves the pressure of the steam causes the internal piston-valve to rise and uncover the orifice. As the demand abates the valve falls automatically, reducing the area of the orifice, and when the demand increases the valve automatically rises and the area of the orifice is increased sufficiently to pass the requisite quantity of steam to supply the increased demand. This indicator is so constructed that there will always be a constant difference of pressure between the induction and eduction passages of the apparatus. Consequently the steam will always pass through the orifice under a constant head, and the rate at which it is flowing will always be indicated by the position of an index or arm connected with the valve which governs the size of the orifice. Another form of steam-rate indicator is provided with a diaphragm furnished with an orifice of fixed size, through which the steam passes under a constant initial pressure. In this form of indicator the position of an index or arm is varied by different rates of flow corresponding to varying differences of pressure on the induction and eduction sides of the orifice.

With any rate-indicator, whether of the particular descriptions just referred to or of the general class first named, by determining the position of an index indicating the rate of flow through the instrument periodically at short intervals, determining therefrom the corresponding rate of flow and integrating the results, an average rate will be obtained, from which the total flow in a given time can be computed. In practical operation, however, it is impossible to determine the different positions of the index by actual observation, because of the frequency and regularity with which the readings must be made, and the object of my invention is to provide an apparatus whereby the total flow through a rate-indicator will be automatically determined; and it consists, generally, in a device provided with what I have termed herein a "contact-surface," such surface being shaped to correspond with the curve representing the different rates, or, as I have called it, "the law of the rate-indicator," and of mechanism adapted to traverse such contact-surface, periodically or at regular intervals, along that ordinate of the curve which corresponds with or represents the rate of flow through the indicator while said surface and its traversing mechanism are in contact.

It consists, further, of registering mechanism adapted to be actuated by such traversing mechanism or while it is in contact with said surface; and it consists, further, of the novel details of construction and arrangement and combination of parts hereinafter set forth.

In the drawings, Figure 1 is a view in elevation and partly in section of my device. Fig. 2 is a plan view thereof, and Fig. 3 is a detail view showing a modified construction of the contact-surface and traversing-wheel.

Similar letters of reference are used to indicate corresponding parts in all the views.

Within a suitable frame-work or casing A is journaled the shaft B, carrying the drum or cylinder C. The drum C is provided with a contact-surface C', which in the drawings is shown as raised above the surface of the drum itself. This contact-surface is shaped to correspond with the curve representing the different rates of flow through the rate-indicator. A coil-spring D, mounted on the arbor E, drives the drum-actuating gears $e$ $e'$, the latter of which meshes with a pinion $b$ on shaft B. A latch F is supported on a pivot at $f$ at one side of the drum, and is adapted to engage normally with a projection $f'$ on the drum C. A clock-movement G is located, by preference, within the casing adjacent to the drum C, and a wheel $g$, controlled thereby, is caused to revolve continuously at a regular rate of speed, thus bringing the spur $g'$, carried by said wheel, periodically into contact with the projection $f^2$ on the lower end of latch F, whereby the latter is tripped at regular predetermined intervals and released from its engagement with the projection $f'$, thus permitting the drum C to be revolved quickly on its axis in the direction shown by the arrow under the action of the coil-spring D and intermediate gearing. Lugs or ears $g^2$, projecting from the frame of the clock-work, serve to support the latch F, and a suitable spring $f^3$ tends to press the upper end of the latch toward the drum C, so that after being released from engagement with the projection $f'$ it will fly back into the path of said projection before the revolution of the drum C is completed, thus arresting the movement of the drum upon the completion of one revolution.

Within the casing A, and parallel with the axis of drum C, is journaled the spindle H, on which is mounted the wheel I. They are connected with each other by a spline or feather $h$, so that the spindle will be revolved by the rotation of the wheel, while the latter is free to be moved along the former in the direction of its length. A pinion J is keyed to one end of the spindle H, outside the main frame A, and meshes with and operates the dial-train $j\ j\ j$ and dial-hands $k\ k\ k$.

The hub of wheel I is swiveled in a collar or sleeve $i$, mounted on the end of the index arm or lever L, and the wheel I is moved up or down on the spindle H at each movement of the index-arm L. This index-arm is suitably connected with the rate-indicator, and its movement or position, and consequently the position of wheel I relatively to the contact-surface C', will correspond at all times with the rate of flow through the rate-indicator. When no current is passing through the indicator, the wheel I will be in the position shown in Fig. 1, and when the flow is at its maximum the wheel will be in a position opposite the lower portion of the contact-surface, as shown by the dotted lines, Fig. 1. When the wheel I is in the position shown by the full lines in Fig. 1, if the drum C be revolved no portion of its surface will come in contact with the wheel, which will remain stationary during the rotation of the drum; but the drum and spindle are so placed relatively to each other that if the wheel I is lowered by the movement of the index-arm, then, when the drum C revolves, the raised or contact surface C' will engage with the periphery of the wheel I, thereby rotating it while such contact-surface is passing under it, the extent of the rotation depending on the length of the ordinate of the curve which is traversed by the wheel, and therefore upon the position of the wheel I as determined by the position of the index-arm. To insure sufficient friction between the contact-surface C' and the wheel I, the periphery of the latter may be made concave and fitted with a round rubber ring or tire, or the contact-surface C' may be serrated in lines parallel with the axis of the drum and the periphery of the wheel I provided with teeth which will mesh with the serrated portion of the drum, as shown in Fig. 3.

As stated, the shape or contour of the contact-surface C' is made to correspond with the curve representing the different rates of flow or law of the rate-indicator. This curve is determined by passing a current through the indicator at a given rate, determined by a standard instrument, and noting the position of the index-arm; then at another rate and another, and so on until each rate of flow for each desired position of the index-arm is determined. Then a point corresponding to each position of the index-arm is laid out upon a base-line, and from each point on such base-line an ordinate is laid out, the length of which corresponds with the rate of flow through the indicator when the index-arm is in the position corresponding with the position of such ordinate. From these ordinates a curve is constructed, which represents what I have termed herein "the law of the rate-indicator," and the contact-surface C' is shaped to correspond with this curve or, rather, with the area included within the base-line and the curve. The wheel I is arranged so that when a current is passing through the indicator at a given rate the wheel will traverse that portion of the contact-surface which corresponds with the ordinate representing the rate of flow for that particular position of the index-arm.

The main frame-work A is suitably attached to the rate-indicator, or otherwise maintained in position, and the dial-train is inclosed within a shell or auxiliary casing $j'$, upon which the dials may be enameled or otherwise affixed.

The operation of my invention will now be readily understood. The clock-train G having been arranged to trip the latch F at regular intervals, at the proper instant the drum C is released, and, under the action of the coil-spring D, makes one revolution quickly and is then arrested by the latch F, the upper end of which has in the meantime fallen into the path of the stop $f'$, attached to the drum. At the expiration of the predetermined interval, which is of such duration as may be found desirable—say, for instance, five minutes or ten minutes—the drum is again permitted to revolve as before, the revolutions being continued at regular intervals or periodically while the apparatus is in operation, the springs which actuate the drum and clock-train being rewound before they run completely down, so that their action is continuous. When no current is flowing through the indicator, as before stated, the wheel I will not be rotated by the revolution of the drum, and consequently the dial or registering train will not be actuated thereby; but as soon as a current begins to flow through the indicator the index-arm will be actuated thereby, and the positions of drum C and wheel I relatively to each other having been properly arranged for, the movement of the index-arm will move the wheel I along the spindle H to a point opposite the ordinate of the contact-surface $C'$, which represents the rate at which the current is then flowing through the indicator. The revolution of the drum will now bring the contact-surface $C'$ into engagement with the wheel I and will cause it to rotate while such contact-surface is passing under it. As long as the flow through the indicator continues each revolution of the drum C will rotate the wheel I more or less, depending entirely upon the position of the index-arm and wheel, and consequently upon the length of the ordinate traversed by the wheel. The rotation of the wheel I causes a corresponding movement in the dial-train $j\,j$ and hands $k\,k$, which will be exactly proportionate to the rate at which the current is passing through the indicator at the time the revolution occurs.

The dial train and hands are so proportioned and arranged that the movement produced therein by one revolution of the drum C, when the index-arm is in a given position, will register in units of any previously-determined size or value the amount of fluid which with the index-arm in such given position will pass through the indicator during the fixed period elapsing between two revolutions of the drum.

It will thus be seen that with my invention I am enabled to integrate and automatically register in units the performance of any rate-indicator with the same degree of mathematical accuracy as is obtained in measuring an area included within a curve by calculations based on the length of frequently-occurring ordinates of such curve.

Various modifications may be made in the construction of the apparatus besides those hereinbefore referred to. For some purposes it may be desirable to have the drum revolve continuously, in which case the latch can be dispensed with and the movement of the drum regulated by the clock-movement. In using my invention with an electric rate-indicator, it may be desirable to substitute an electro-motor for the coil-springs which release and actuate the drum C. Weights may also be substituted for these purposes, if desired. Several curves may be employed on the same drum, and the contact-surface $C'$, instead of being mounted on the drum, may be supported on a horizontal revoluble disk having short uprights, to which the contact-surface is secured, and such contact-surface may be flat instead of cylindrical and arranged to reciprocate under the wheel I. None of these modifications, however, would constitute a departure from my invention, the essential feature of which is a contact-surface shaped to represent the law of the rate-indicator.

I use the word "periodically" in the claims to designate the operation of the mechanism therein referred to, either with the drum C revolving continuously or at regular fixed intervals.

Having thus described my invention, what I claim as new, and desire to secure by Letters Patent, is—

1. The combination, with a rate-indicator, of a contact-surface shaped to correspond with the curve representing the law of the rate-indicator, mechanism adapted to traverse said contact-surface periodically, mechanism adapted to vary the relative positions of said contact-surface and said traversing mechanism to correspond with the varying rates of flow through the indicator, and a registering device adapted to be actuated while said traversing mechanism is passing across said contact-surface, substantially as and for the purposes set forth.

2. The combination, with a rate-indicator, of a contact-surface shaped to correspond with the curve representing the law of the rate-indicator, a wheel adapted to traverse said contact-surface, mechanism for varying the relative positions of said contact-surface and said wheel to correspond with the rate of flow through the indicator, and registering mechanism adapted to be actuated by the rotation of said wheel, substantially as and for the purposes set forth.

3. The combination, with a rate-indicator, of a revoluble contact-surface shaped to correspond with the curve representing the law of the rate-indicator, a wheel adapted to traverse said contact-surface periodically, mechanism for varying the relative positions of said contact-surface and said wheel to correspond with the rate of flow through the indicator, and registering mechanism, adapted to be actuated by the rotation of said wheel, substantially as and for the purposes set forth.

4. The combination, with a rate-indicator, of a revoluble drum having a portion of its surface shaped to correspond with the curve representing the law of the rate-indicator, a wheel adapted to traverse such portion of said surface periodically, an index-arm carrying said wheel and adapted to vary the position thereof relatively to the drum in accordance with the rate of flow through the indicator, and registering mechanism adapted to be actuated by the rotation of said wheel, substantially as and for the purposes set forth.

5. The combination, with a rate-indicator, of a revoluble drum having a raised surface shaped to correspond with the curve representing the law of the rate-indicator, mechanism for revolving said drum at regular intervals, a wheel adapted to engage with and be rotated by said raised or contact surface of the drum as the latter revolves, an arm carrying said wheel and adapted to vary the position thereof relatively to said contact-surface in accordance with the rate of flow through the indicator, and a registering-train adapted to be actuated by the rotation of said wheel, substantially as and for the purposes set forth.

6. The combination, with a rate-indicator, of a revoluble drum having a raised surface shaped to correspond with the curve representing the law of the rate-indicator, mechanism for revolving said drum continuously at a uniform speed, a wheel adapted to engage with and be rotated by said raised or contact surface as the drum revolves, an arm carrying said wheel and adapted to vary the position thereof relatively to said contact-surface in accordance with the rate of flow through the indicator, and a registering-train adapted to be actuated by the rotation of said wheel, substantially as and for the purposes set forth.

7. The combination, with a rate-indicator, of a spring-actuated revoluble drum having a raised or contact-surface shaped to correspond with the curve representing the law of the rate-indicator, a wheel adapted to engage with and be rotated by said raised or contact surface as the drum revolves, an arm carrying said wheel and adapted to vary the position thereof relatively to said contact-surface in accordance with the rate of flow through the indicator, a latch adapted to release said drum and permit it to revolve at regular intervals, a stop to arrest the movement of said drum upon the completion of one revolution, and a registering-train adapted to be actuated by the rotation of said wheel, substantially as and for the purposes set forth.

HERMAN HOLLERITH.

Witnesses:
S. G. METCALF,
WILLIAM LIND.